US011118512B2

(12) United States Patent
Miyamoto et al.

(10) Patent No.: US 11,118,512 B2
(45) Date of Patent: Sep. 14, 2021

(54) GAS TURBINE

(71) Applicants:Mitsubishi Hitachi Power Systems, Ltd., Kanagawa (JP); MITSUBISHI HEAVY INDUSTRIES, LTD., Tokyo (JP)

(72) Inventors: Kenji Miyamoto, Tokyo (JP); Satoshi Takiguchi, Tokyo (JP); Masakazu Nose, Yokohama (JP)

(73) Assignee: MITSUBISHI POWER, LTD., Kanagawa (JP)

( * ) Notice: Subject to any disclaimer, the term of this patent is extended or adjusted under 35 U.S.C. 154(b) by 65 days.

(21) Appl. No.: 16/089,076

(22) PCT Filed: Mar. 28, 2017

(86) PCT No.: PCT/JP2017/012522
§ 371 (c)(1),
(2) Date: Sep. 27, 2018

(87) PCT Pub. No.: WO2017/170477
PCT Pub. Date: Oct. 5, 2017

(65) Prior Publication Data
US 2019/0107053 A1    Apr. 11, 2019

(30) Foreign Application Priority Data

Mar. 30, 2016 (JP) .............................. JP2016-068018

(51) Int. Cl.
*F02C 7/18* (2006.01)
*F23R 3/28* (2006.01)
(Continued)

(52) U.S. Cl.
CPC .................. *F02C 7/18* (2013.01); *F02C 6/08* (2013.01); *F02C 7/08* (2013.01); *F02C 7/22* (2013.01);
(Continued)

(58) Field of Classification Search
CPC .... F02C 6/08; F02C 7/18; F02C 7/185; F02C 7/08; F23R 3/28; F23R 3/44; F23R 3/46;
(Continued)

(56) References Cited

U.S. PATENT DOCUMENTS 4,850,196 A      7/1989  Scalzo et al.
5,165,241 A  *  11/1992  Joshi .................. F23R 3/286
                                                                60/737
(Continued)

FOREIGN PATENT DOCUMENTS

JP       01-130015        5/1989
JP       03-105104        5/1991
(Continued)

OTHER PUBLICATIONS

International Search Report dated Jun. 20 2017 in International (PCT) Application No. PCT/JP2017/012522.
(Continued)

*Primary Examiner* — Scott J Walthour
(74) *Attorney, Agent, or Firm* — Wenderoth, Lind & Ponack, L.L.P.

(57) ABSTRACT

There is provided a gas turbine (1) including a compressor (2) that generates compressed air, a casing (5) into which the compressed air is introduced, a combustor (3) that generates a combustion gas, a turbine (4) that is driven by the combustion gas, a combustor cooling system (6) that has a sub-compressor (62), which is able to be operated independently of the compressor (2), and a heat exchanger (61), which extracts air in the casing (5) and causes the air to exchange heat after the sub-compressor (62) has increased a pressure of the air, and that introduces the air, which has exchanged heat, into a cooling passage (31) of a cylindrical body (30) of the combustor (3), and a combustor air introducing system that extracts air flowing in the combustor
(Continued)

cooling system (6) and introduces the air into the combustor (3).

4 Claims, 7 Drawing Sheets

(51) Int. Cl.
| | | |
|---|---|---|
| *F02C 6/08* | (2006.01) | |
| *F02C 7/22* | (2006.01) | |
| *F23R 3/32* | (2006.01) | |
| *F23R 3/10* | (2006.01) | |
| *F02C 7/08* | (2006.01) | |
| *F23L 15/00* | (2006.01) | |
| *F23R 3/00* | (2006.01) | |
| *F23R 3/14* | (2006.01) | |

(52) U.S. Cl.
CPC .............. *F23L 15/00* (2013.01); *F23R 3/005* (2013.01); *F23R 3/10* (2013.01); *F23R 3/14* (2013.01); *F23R 3/28* (2013.01); *F23R 3/286* (2013.01); *F23R 3/32* (2013.01); *F05D 2220/32* (2013.01); *F05D 2260/213* (2013.01); *F05D 2260/221* (2013.01)

(58) Field of Classification Search
CPC .. F23R 3/005; F23R 3/14; F23R 3/286; F23L 15/00
See application file for complete search history.

(56) References Cited

U.S. PATENT DOCUMENTS

| | | | |
|---|---|---|---|
| 5,216,885 A | | 6/1993 | Taniguchi et al. |
| 5,313,783 A | * | 5/1994 | Althaus ............... F02C 1/02 60/39.181 |
| 5,349,812 A | | 9/1994 | Taniguchi et al. |
| 5,657,632 A | * | 8/1997 | Foss ................. F23D 17/002 60/742 |
| 5,660,045 A | | 8/1997 | Ito et al. |
| 5,782,076 A | * | 7/1998 | Huber ................. F02C 7/08 415/115 |
| 2009/0260342 A1 | | 10/2009 | Ishiguro et al. |
| 2014/0096529 A1 | * | 4/2014 | Overby ............... F23R 3/02 60/772 |
| 2017/0138201 A1 | | 5/2017 | Takata |

FOREIGN PATENT DOCUMENTS

| | | |
|---|---|---|
| JP | 05-203146 | 8/1993 |
| JP | 08-086407 | 4/1996 |
| JP | 2713627 | 2/1998 |
| JP | 2951620 | 9/1999 |
| JP | 11-343869 | 12/1999 |
| JP | 3183053 | 7/2001 |
| JP | 2003-042453 | 2/2003 |
| JP | 2008-025910 | 2/2008 |
| JP | 2008-082247 | 4/2008 |
| JP | 2013-139975 | 7/2013 |
| JP | 2013-178035 | 9/2013 |
| JP | 2015-222022 | 12/2015 |

OTHER PUBLICATIONS

Written Opinion of International Searching Authority dated Jun. 20, 2017 in International (PCT) Application No. PCT/JP2017/012522 with English translation,.

* cited by examiner

GAS TURBINE

TECHNICAL FIELD

The present invention relates to a gas turbine.

Priority is claimed on Japanese Patent Application No. 2016-068018, filed on Mar. 30, 2016, the content of which is incorporated herein by reference.

BACKGROUND ART

A general gas turbine includes a compressor that compresses external air to generate high-pressure air, a combustor that mixes the high-pressure air with fuel and combusts a mixture to generate a high-temperature and high-pressure combustion gas, and a turbine that is rotation-driven by the combustion gas.

A combustor disclosed in the following PTL 1 is known as an example of a combustor which is used in such a gas turbine. The combustor according to PTL 1 mainly includes a combustion cylinder in which a combustion gas flows and a plurality of nozzles for generating flame in the combustion cylinder. A high-temperature and high-pressure combustion gas is generated in the combustion cylinder by the flame generated by the nozzles.

CITATION LIST

Patent Literature

[PTL 1] Japanese Unexamined Patent Application, First Publication No. H5-203146

SUMMARY OF INVENTION

Technical Problem

By the way, in some cases, a phenomenon called flashback occurs inside the combustor described above in the process of fuel and air flowing. The flashback is a phenomenon in which abnormal combustion occurs by a flame igniting fuel present in an unexpected region in the combustor.

In recent years, flashback is more likely to occur since there is a tendency that an operation temperature rises, compared to the past, with a performance improvement of a gas turbine. In addition, there is a possibility of an increase in NOx generation with a rise in the operation temperature of the gas turbine.

For this reason, there is an increasing need for a gas turbine that can sufficiently suppress the occurrence of flashbacks and has reduced NOx generation even under high-temperature operation.

The invention is devised in order to solve the problems and an object thereof is to provide a gas turbine that can stably operate even under a high temperature.

Solution to Problem

According to a first aspect of the invention, there is provided a gas turbine including a compressor that compresses external air to generate compressed air, a casing into which the compressed air is introduced, a combustor that mixes the compressed air introduced from an inside of the casing with fuel and combusts a mixture to generate a combustion gas and has a cylindrical body through which the combustion gas passes, a turbine that is driven by the combustion gas, a combustor cooling system that has a sub-compressor, which is able to be operated independently of the compressor, and a heat exchanger, which extracts air in the casing and causes the air to exchange heat after the sub-compressor has increased a pressure of the air, and that introduces the air, which has exchanged heat, into a cooling passage of the cylindrical body, and a combustor air introducing system that extracts air flowing in the combustor cooling system and introduces the air into the combustor.

In this configuration, some of air flowing in the combustor cooling system are extracted by the combustor air introducing system. A possibility of the occurrence of stay or stagnation of air or fuel gas in each portion in the combustor can be reduced by introducing the extracted air into the combustor. Accordingly, a flashback can be suppressed.

In the gas turbine according to a second aspect of the invention, the combustor air introducing system may introduce air, which is extracted from an extraction position which is closer to a casing than the heat exchanger in the combustor cooling system, into the combustor.

In this configuration, since the extraction position is closer to the casing than the heat exchanger, the pressure of air flowing in the combustor air introducing system is the same as compressed air in the casing. That is, air can be stably introduced into a location with a relatively low pressure in the combustor without another compressor being provided.

In the gas turbine according to a third aspect of the invention, the combustor air introducing system may introduce air, which is extracted from an extraction position which is closer to a cooling passage than the heat exchanger in the combustor cooling system, into the combustor.

In this configuration, the extraction position is closer to the cooling passage than the heat exchanger. That is, air compressed by the sub-compressor can be led to the combustor air introducing system. Accordingly, air can be stably introduced also into a location with a relatively high pressure in the combustor.

In the gas turbine according to a fourth aspect of the invention, the combustor may have an outer shell that is provided on an outer circumferential side of the cylindrical body and forms an air flow path, in which the compressed air flows, between an outer circumferential surface of the cylindrical body and the outer shell and a peg in which a injecting hole for injecting the fuel is formed in a direction intersecting a circulation direction of the compressed air in the air flow path. A peg air hole for injecting air supplied from the combustor air introducing system toward a downstream side in the circulation direction of the compressed air may be formed in the peg.

In this configuration, air can be supplied to a location around the peg since the peg is provided with the peg air hole. In particular, since a stagnation point is likely to be formed on the downstream side (downstream side in the circulation direction of compressed air) of the peg, there is a possibility that air including a large amount of fuel stays. However, in the configuration, such stay or stagnation can be swept away to the downstream side by air supplied from the peg air hole. Accordingly, a possibility of the occurrence of a flashback on the downstream side of the peg can be reduced.

In the gas turbine according to a fifth aspect of the invention, the combustor may have a first nozzle that supplies the fuel into the cylindrical body, mixes the fuel with the compressed air and combusts a mixture, and a first swirler that is provided on an outer circumferential side of the first nozzle and causes a swirl to be generated in the combustion gas. A first nozzle air hole for injecting air supplied from the combustor air introducing system toward a vortex center of the swirl may be formed in a tip of the first nozzle.

A swirl (swirling flow) is generated on the downstream side of the tip of the first nozzle by the first swirler. Air including a large amount of fuel stays in a region including such a swirling flow or the center of a vortex in some cases. However, since the first nozzle air hole is formed in the tip of the first nozzle in the configuration, air can be supplied to the vortex center. By a flow of this air, air (air including a large amount of fuel) staying at the vortex center can be swept away to the downstream side. Therefore, a possibility of the occurrence of a flashback on the downstream side of the first nozzle or the unexpected generation of a combustion region can be reduced.

In the gas turbine according to a sixth aspect of the invention, the combustor may have a second nozzle which is provided to be parallel to the first nozzle and in which a second nozzle injecting hole for injecting fuel for ignition onto the first nozzle is formed. A second nozzle air hole that is formed so as to surround the second nozzle injecting hole from an outer circumferential side and is for injecting the air supplied from the combustor air introducing system may be formed in the second nozzle.

In this configuration, the second nozzle air hole that surrounds the second nozzle injecting hole from the outer circumferential side is formed in the second nozzle. Accordingly, a possibility of air including a large amount of fuel staying around the second nozzle injecting hole can be reduced. Substantially the same combustion conditions as premixed combustion can be realized by supplying air the periphery of the second nozzle injecting hole. Accordingly, for example, in a case where a load of the gas turbine is high or the like, NOx generation can be reduced.

Advantageous Effects of Invention

According to the invention, a gas turbine that can stably operate even under a high temperature can be provided.

DESCRIPTION OF EMBODIMENTS

First Embodiment

Figure 1:
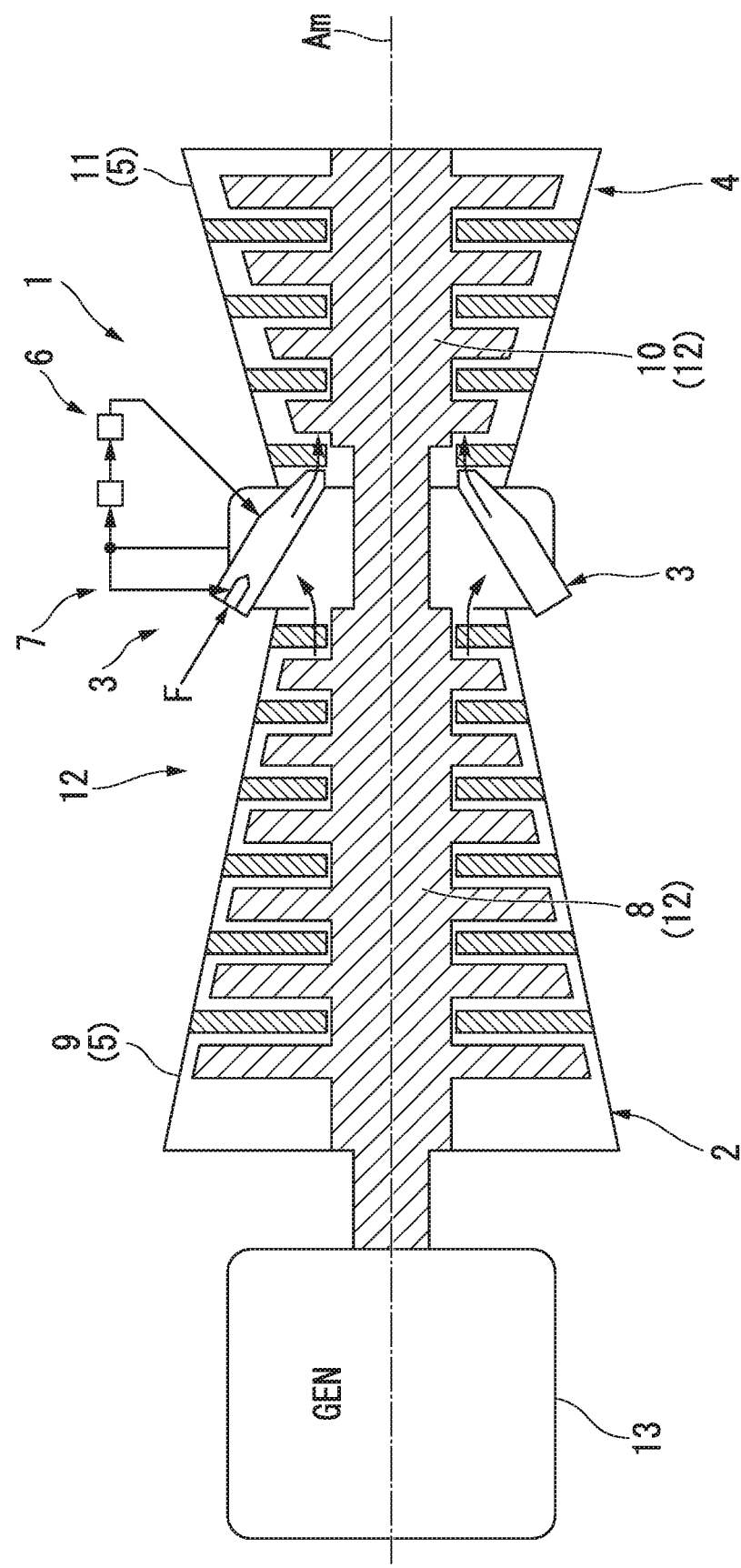
FIG. 1 is a view illustrating a configuration of a gas turbine according to a first embodiment of the invention.

A first embodiment of the invention will be described with reference to FIGS. 1 to 7. As illustrated in FIG. 1, a gas turbine 1 according to the embodiment includes a compressor 2, a combustor 3, a turbine 4, a casing 5, a combustor cooling system 6, and a combustor air introducing system 7.

The compressor 2 compresses external air and generates high-pressure compressed air. More specifically, the compressor 2 has a compressor rotor 8 that rotates about a main axis Am and a compressor casing 9 that covers the compressor rotor 8 from an outer circumferential side. The turbine 4 has a turbine rotor 10 that rotates about the main axis Am and a turbine casing 11 that covers the turbine rotor 10 from the outer circumferential side. By being integrally connected to each other on the main axis Am, the compressor rotor 8 and the turbine rotor 10 form a gas turbine rotor 12. In addition, by being connected to each other, the compressor casing 9 and the turbine casing 11 form the gas turbine casing 5 (hereinafter, simply called the casing 5 in some cases). For example, a generator 13 is connected to one end of the gas turbine rotor 12. Power is supplied to the outside by driving the generator 13 with the rotation of the gas turbine rotor 12. The combustor 3 generates a high-temperature and high-pressure combustion gas by combusting fuel in compressed air generated by the compressor 2.

Figure 2:
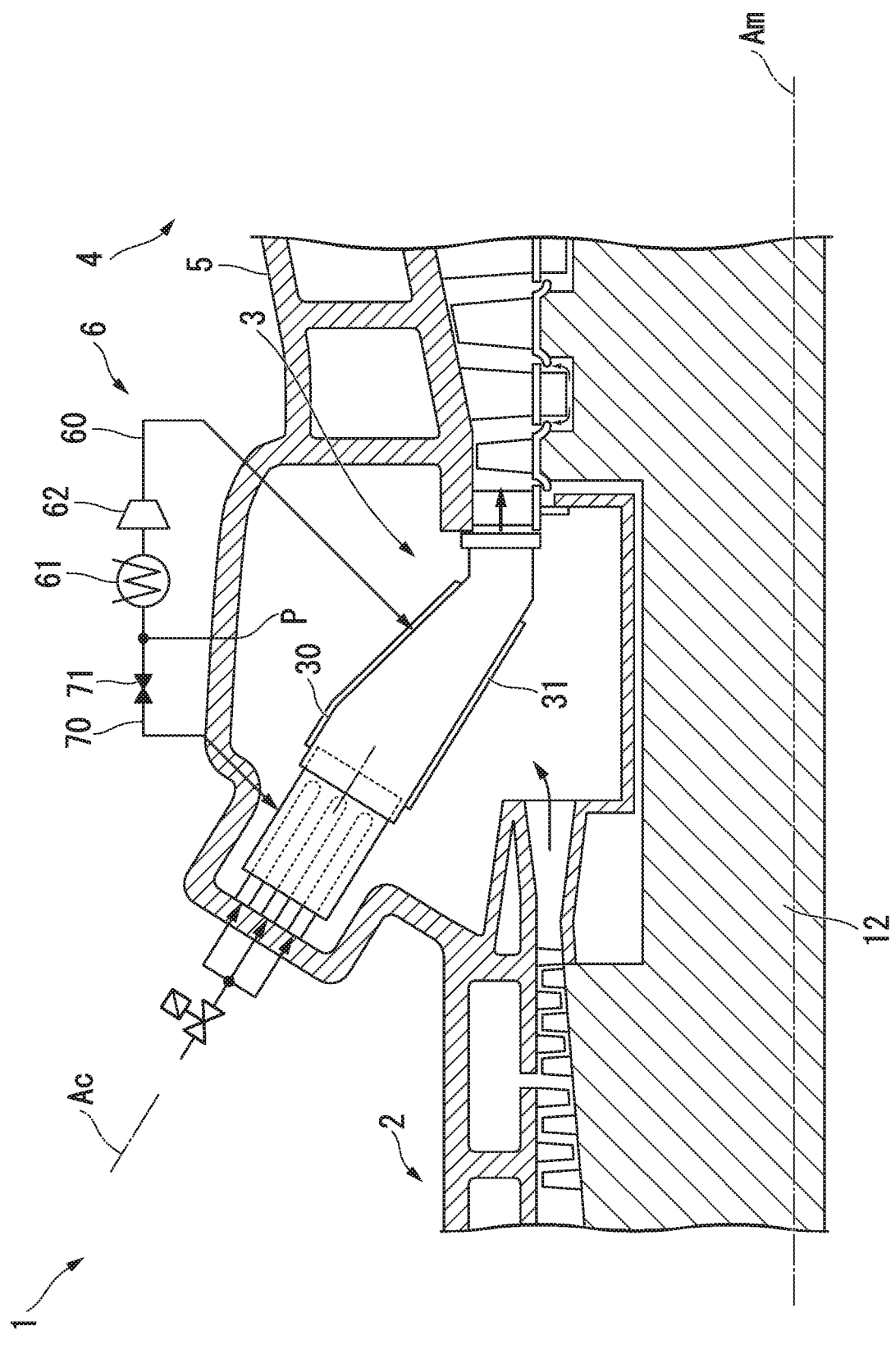
FIG. 2 is a view illustrating a configuration of a combustor according to the first embodiment of the invention.

As illustrated in FIG. 2, the combustor 3 has a combustion cylinder 30 (cylindrical body) through which a combustion gas passes. The combustion cylinder 30 of the embodiment has a double pipe structure. A space between a pipe on an inner circumferential side of the combustion cylinder 30 and a pipe on the outer circumferential side is set as a cooling passage 31. Air supplied through the combustor cooling system 6 to be described later flows in the cooling passage 31. Accordingly, the combustion cylinder 30 exposed to the high temperature of a combustion gas can be protected from heat.

The combustor cooling system 6 has a first line 60 that connects a space in the casing 5 to the cooling passage 31 of the combustion cylinder 30, a heat exchanger 61 provided on the first line 60, and a sub-compressor 62. Some of compressed air flowing in the casing 5 is extracted by allowing one end side of the first line 60 to communicate with an inside of the casing 5. The heat exchanger 61 causes heat to be exchanged between the extracted compressed air and external air. The sub-compressor 62 increases the pressure of the air, which has exchanged heat by the heat exchanger 61 and the air becomes cooling air. The sub-compressor 62 is separately provided from the compressor 2 and is able to be operated independently of the compressor 2.

The combustor air introducing system 7 has a second line 70 that connects an extraction position P on an upstream side of the heat exchanger 61 on the first line 60 to the combustor 3 and a flow rate regulating valve 71 provided on the second line 70. Separately from fuel, air flowing in the second line 70 is supplied to each of a peg 38, first nozzles 34, and a second nozzle 35, all of which are to be described later, inside the combustor 3.

Figure 3:
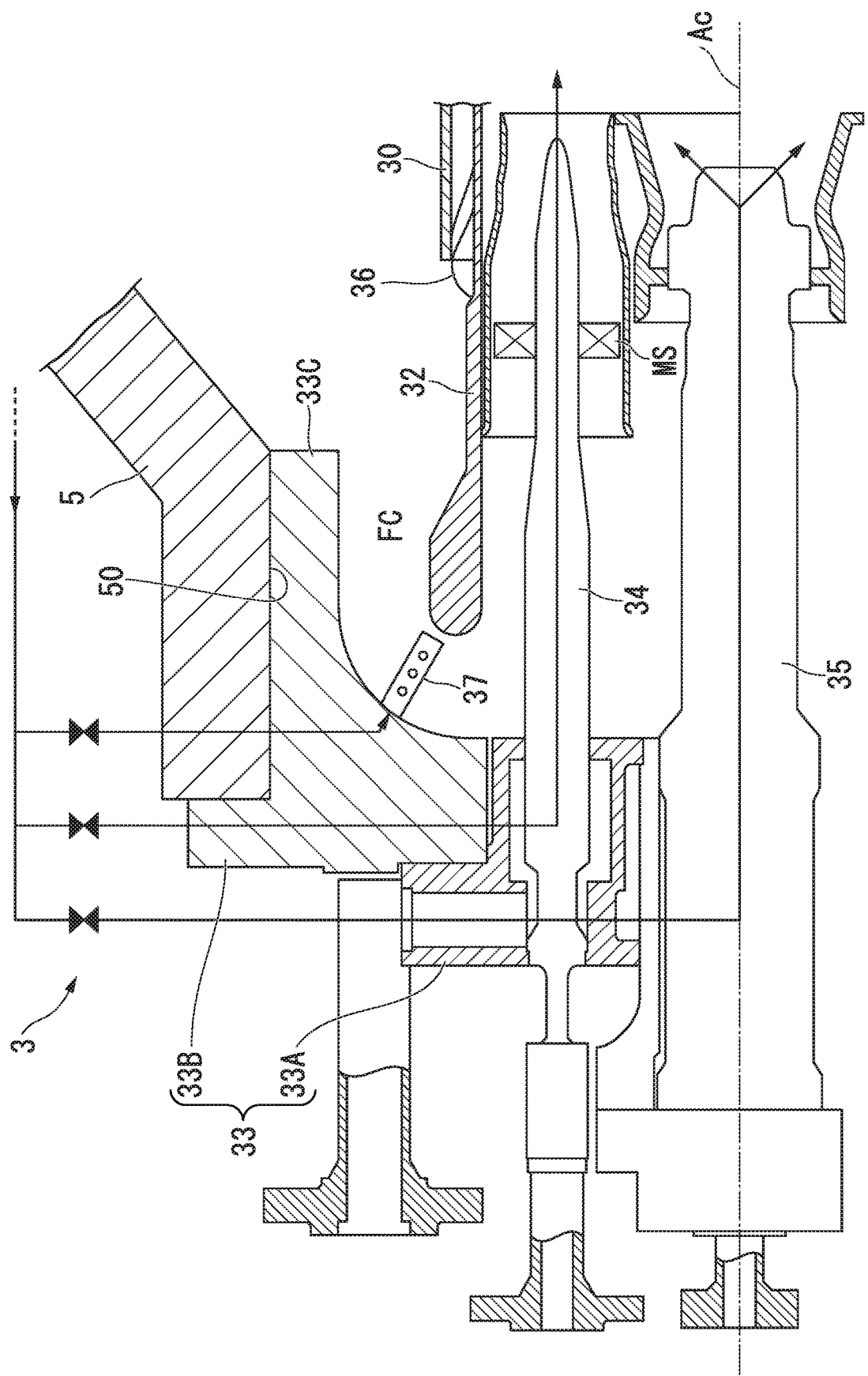
FIG. 3 is an enlarged view of main parts of the combustor according to the first embodiment of the invention.

Next, a detailed configuration of the combustor 3 will be described with reference to FIG. 3. The combustor 3 has the combustion cylinder 30, a swirler supporting cylinder 32, an outer shell 33, the first nozzles 34, and the second nozzle 35. The combustion cylinder 30 is formed in a cylindrical shape extending along a central axis Ac. The swirler supporting cylinder 32 is attached to one end side of the combustion cylinder 30. The outer shell 33 is attached to one end side of the swirler supporting cylinder 32. The first nozzles 34 and the second nozzle 35 are supported in the combustion cylinder 30 by the outer shell 33. In the following description, a side where the outer shell 33 is located with respect to the swirler supporting cylinder 32 will be called an upstream side. A side where the combustion cylinder 30 is located with respect to the swirler supporting cylinder 32 will be called a downstream side.

The swirler supporting cylinder 32 has an outer diameter dimension smaller than that of the combustion cylinder 30. A portion including the other end portion of the swirler supporting cylinder 32 is inserted on the inner circumferential side of the combustion cylinder 30. The combustion cylinder 30 is fixed to the swirler supporting cylinder 32 via a connecting member 36 so as to be unable to fall off.

The outer shell 33 is a bottomed cylindrical member provided so as to close a combustor insertion hole 50 formed in the casing 5. The outer shell 33 has a nozzle stand 33A that supports the second nozzle 35 and the first nozzles 34 and an outer shell main body 33B that fixes and supports the nozzle stand 33A with respect to the casing 5.

The nozzle stand 33A is a member formed in a substantially disk shape about the central axis Ac, and one second nozzle 35 is inserted in a region including a center point thereof. On an outer circumferential side of the second nozzle 35, a plurality of first nozzles 34 are arranged at an interval to each other in a circumferential direction of the central axis Ac. Both of the first nozzles 34 and the second nozzle 35 have a substantially pipe shape. Fuel supplied from a fuel supply source flows inside the first nozzles 34 and the second nozzle 35.

A fitting protrusion 33C that is fitted into an inner wall of the casing 5 is provided on a surface of the outer shell main body 33B on the downstream side. The fitting protrusion 33C protrudes from a bottom portion of the outer shell main body 33B toward the downstream side. A surface of the fitting protrusion 33C on the inner circumferential side opposes an outer circumferential surface of the swirler supporting cylinder 32 with a gap placed therebetween. The gap is set as an air flow path FC for leading compressed air in the casing 5 into the combustor 3. A portion connecting an inner circumferential surface of the fitting protrusion 33C to the bottom portion has a curved shape. In addition, a gap is formed between an upstream end portion of the swirler supporting cylinder 32 and the bottom portion of the outer shell main body 33B. Accordingly, compressed air led along the air flow path FC from the downstream side to the upstream side is introduced into an inside of the swirler supporting cylinder 32.

Figure 4:
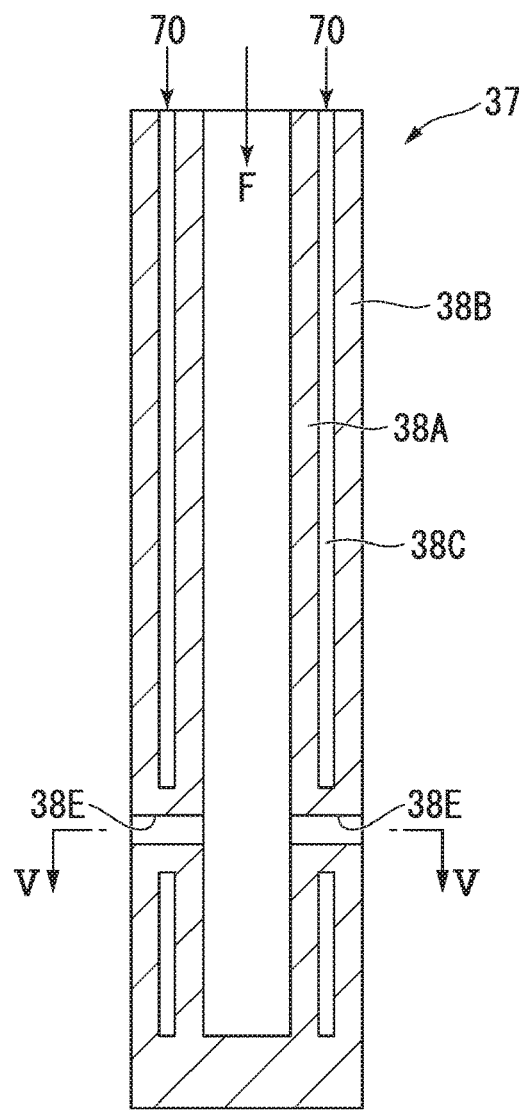
FIG. 4 is a sectional view illustrating a configuration of a peg according to the first embodiment of the invention.
Figure 5:
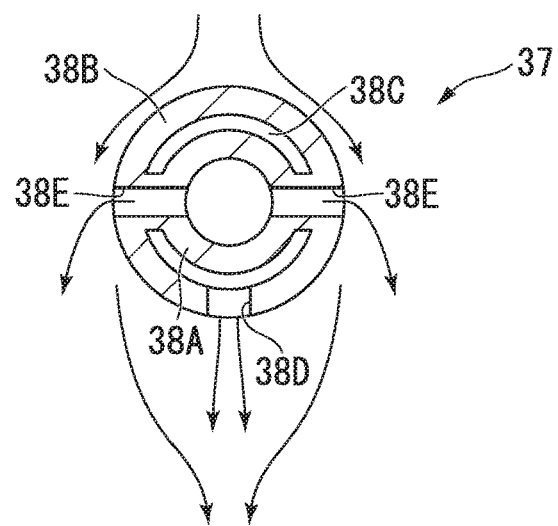
FIG. 5 is a sectional view taken along line V-V of FIG. 4.
Figure 6:
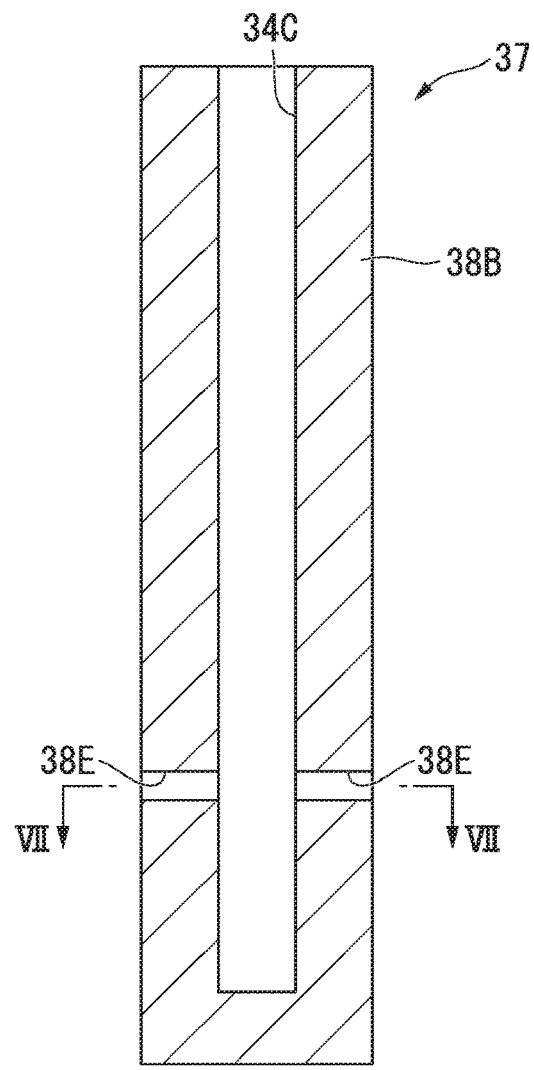
FIG. 6 is a sectional view illustrating a modification example of the peg according to the first embodiment of the invention.

A peg 37 for supplying fuel in the air flow path FC is attached to an inner circumferential surface of the outer shell main body 33B. The peg 37 is a bar-like nozzle provided so as to protrude from the inner circumferential surface of the outer shell main body 33B. More specifically, as illustrated in FIGS. 4 and 5, the peg 37 has a double pipe structure. The peg 37 has a peg inner pipe 38A in which the fuel F flows and a peg outer pipe 38B provided on an outer circumferential side of the peg inner pipe 38A.

A gap that extends in a diameter direction of the pipes (peg air flow path 38C) is formed between the peg inner pipe 38A and the peg outer pipe 38B. The peg air flow path 38C communicates with the second line 70 of the combustor air introducing system 7. Compressed air flowing in the second line 70 flows in the peg air flow path 38C. A peg air hole 38D for injecting air in the peg air flow path 38C toward the outside is formed in the middle of the extending peg outer pipe 38B.

A plurality of (two) injecting holes 38E, which allow the peg inner pipe 38A to communicate with the outside and are for injecting fuel, are formed in an outer circumferential surface of the peg outer pipe 38B. In the embodiment, the two injecting holes 38E are open toward a direction orthogonal to a direction where the peg inner pipe 38A extends. In addition, the two injecting holes 38E are open toward directions of being separated away from each other in a diameter direction of the peg outer pipe 38B.

The peg 37 configured in such a manner is fixed to the outer shell main body 33B with the following posture. That is, as illustrated in FIG. 5, the two injecting holes 38E are open toward a direction intersecting (orthogonal to) a circulation direction of compressed air in the air flow path FC. The peg air hole 38D is open toward a direction where this compressed air flows.

Next, an operation of the gas turbine 1 according to the embodiment will be described. To start the gas turbine 1, the compressor 2 is driven by a power source (not illustrated), first. High-pressure compressed air is generated by driving the compressor 2. The compressed air is introduced into the combustor 3 through the space in the casing 5. After fuel in the compressed air is mixed, combustion flame is formed through ignition by an igniter (not illustrated) in the combustor 3. Accordingly, a high-temperature and high-pressure combustion gas is generated. A combustion gas is introduced into the subsequent turbine 4 through the space in the casing 5 and rotation-drives the turbine 4. Accordingly, an external device connected to a shaft end of the turbine rotor 10, such as the generator 13, is driven.

During operation of the gas turbine 1 described above, the temperature of a combustion gas generally reaches approximately 1,500° C. A measure for protecting each member of the combustor 3 from radiant heat or the like is necessary in order to continuously and stably operate under such a high-temperature environment. In the gas turbine 1 according to the embodiment, the combustor cooling system 6 described above cools part of the combustor 3. More specifically, after some of compressed air in the casing 5 is extracted through the first line 60, the extract compressed air is supplied into the cooling passage 31 of the combustion cylinder 30 through heat exchange by the heat exchanger 61 and compression by the sub-compressor 62. Accordingly, the combustion cylinder 30 can be sufficiently protected from the radiant heat or the like.

There has been a concern over the occurrence of a phenomenon, such as a flashback, in each portion of the combustor 3 with a rise in a gas turbine operation temperature in recent years. In particular, the peg 37 extends in the direction intersecting the circulation direction of compressed air. For this reason, a stagnation point is formed in a downstream region of the outer circumferential surface of the peg outer pipe 38B in some cases. After combustion flame in the combustion cylinder 30 has spread, the flame stabilizes in a case where compressed air including fuel which is injected from the peg 37 has stayed in such a stagnation point.

However, the peg air hole 38D open toward the downstream side of the peg outer pipe 38B is formed in the peg 37 according to the embodiment. Compressed air in the casing 5 is injected from the peg air hole 38D through the combustor air introducing system 7. Air or fuel staying on the downstream side of the peg outer pipe 38B can be swept away toward the downstream side by this compressed air.

That is, it is possible to stably operate the gas turbine 1 even under a high-temperature environment by sufficiently reducing a possibility of the occurrence of a flashback nearby the peg 37.

Although the first embodiment of the invention has been described hereinbefore, various modifications can be added to the configuration without departing from the gist of the invention.

For example, a configuration where fuel and air are injected independently of each other by the peg 37 having a double pipe structure is adopted in the embodiment. However, an aspect of the peg 37 is not limited thereto, and a configuration illustrated in FIGS. 6 and 7 can also be adopted.

Figure 7:
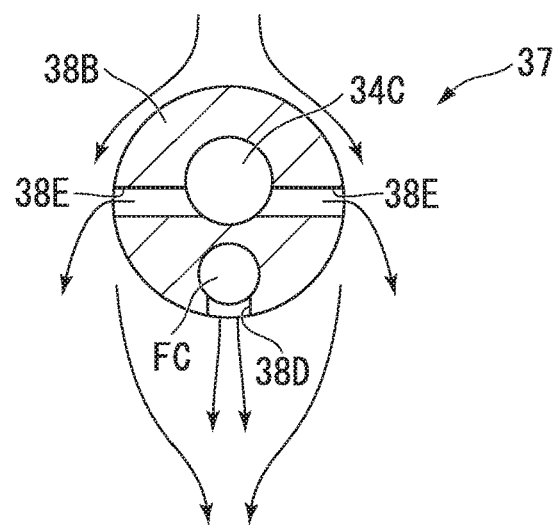
FIG. 7 is a sectional view taken along line VII-VII of FIG. 6.

As illustrated in FIG. 7, the peg 37 (peg outer pipe 38B) of the modification example has, inside thereof, a fuel flow path 34C, in which fuel flows, and the air flow path FC provided so as to be separated away from the fuel flow path 34C in a diameter direction of the peg 37. Fuel supplied from the fuel flow path 34C is injected to the outside through the injecting holes 38E. Air is injected to the outside from the air flow path FC through the peg air hole 38D.

In such a configuration, it is possible to integrally form the peg 37 by one member, in addition to obtaining the same operational effects as the first embodiment. For this reason, the number of components can be reduced and maintainability can be improved accordingly.

Second Embodiment

Next, a second embodiment of the invention will be described with reference to FIG. 8. The embodiment is different from the first embodiment in the following ways. That is, in a combustor 203 according to the embodiment, air is supplied from the combustor air introducing system 7 to the first nozzles 34.

Figure 8:
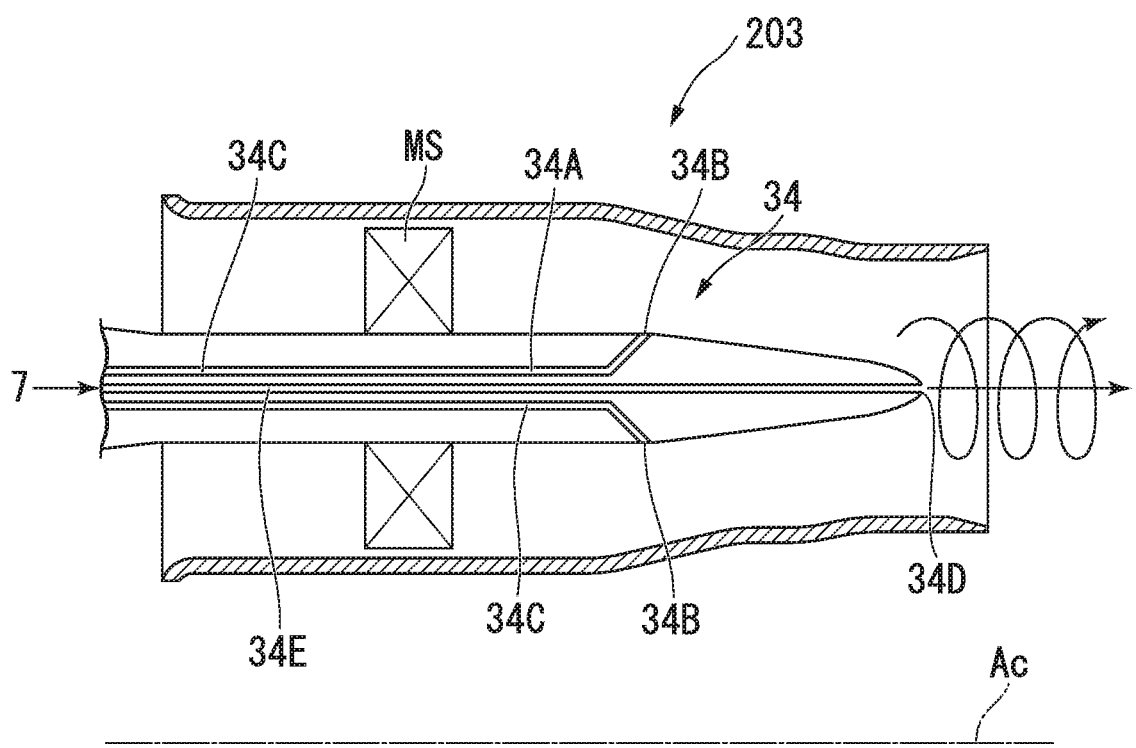
FIG. 8 is an enlarged view of main parts of a combustor (first nozzle) according to a second embodiment of the invention.

More specifically, as illustrated in FIG. 8, each of the first nozzles 34 includes a cylindrical first nozzle main body 34A, in which fuel and compressed air flow, and a first swirler MS provided on the upstream side of the first nozzle main body 34A. The first nozzle main body 34A extends from the upstream side to the downstream side and has a downstream end portion formed in a sharp shape of which a diameter gradually decreases from the upstream side to the downstream side.

A plurality of first nozzle injecting holes 34B for injecting fuel are formed in a portion which is slightly with respect to the upstream side of the downstream end portion of the first nozzle main body 34A. The first nozzle injecting holes 34B are equidistantly arranged in a circumferential direction of the first nozzle main body 34A. In addition, the fuel flow path 34C for allowing fuel to flow therein is formed inside the first nozzle main body 34A. The fuel flow path 34C extends in a linear shape that is parallel to the central axis Ac. Each of the first nozzle injecting holes 34B forms a fixed angle with respect to the fuel flow path 34C.

A first nozzle air hole 34D for injecting compressed air is formed in the downstream end portion (tip) of the first nozzle main body 34A. The first nozzle air hole 34D communicates with a first nozzle air flow path 34E formed inside the first nozzle main body 34A. The combustor air introducing system 7 is connected to the upstream side of the first nozzle air flow path 34E. That is, air which has flowed through the combustor air introducing system 7 is injected from the first nozzle air hole 34D.

The first swirler MS is provided at a position closer to the upstream side of the first nozzle injecting holes 34B, which is on an outer circumferential surface of the first nozzle main body 34A. The first swirler MS has a plurality of swirler vanes equidistantly arranged in the circumferential direction of the first nozzle main body 34A. Each of the swirler vanes forms a fixed angle with respect to a direction where the first nozzle main body 34A extends when seen from a diameter direction of the first nozzle main body 34A. Accordingly, a swirl component (swirling flow component) is added to compressed air that has flowed from the upstream side of the first nozzle 34. More specifically, a flow in which a swirl is generated by the first swirler MS flows from the upstream side to the downstream side while turning in a circumferential direction of the first nozzle 34.

An operation of the combustor 203 configured in such a manner will be described. First, during normal operation of the combustor 203, compressed air in the casing 5 supplied from the upstream side of the first nozzle 34 flows through a space on an outer circumferential side of the first nozzle 34. At this time, the flow of this compressed air includes a swirl component since the first nozzle 34 is provided with the first swirler MS.

Fuel injected from the first nozzle injecting holes 34B is mixed to generate a premixed gas in a downstream region with respect to the flow of the compressed air including the swirl component. Flame formed by the second nozzle 35 spreads to this premixed gas. Accordingly, the premixed gas is ignited and premixed combustion flame extending from the upstream side to the downstream side in the combustion cylinder 30 is formed, thereby generating a high-temperature and high-pressure combustion gas.

Since a swirl component by the first swirler MS is added to a premixed gas herein, also premixed combustion flame and a combustion gas form a flow of turning in the circumferential direction of the first nozzle 34. For this reason, a vortex center of a swirl is formed on an extension line of the tip of the first nozzle 34. In a case where the premixed gas is captured and stays in such a vortex center, there is a possibility that flame on the downstream side spreads and a flashback occurs.

However, the first nozzle air hole 34D in the combustor 203 according to the embodiment is formed in the tip of first nozzle main body 34A as described above. For this reason, compressed air can be injected from the first nozzle air hole 34D to the vortex center. Accordingly, a flow velocity component from the upstream side to the downstream side at the vortex center can be increased. For this reason, a possibility of a premixed gas staying at the vortex center can be reduced. Simultaneously, a fuel concentration at the vortex center can also be lowered by supplied compressed air. Therefore, a possibility of the occurrence of a flashback nearby the first nozzle 34 can be sufficiently reduced in the combustor 203 according to the embodiment.

Third Embodiment

Next, a third embodiment of the invention will be described with reference to FIGS. 9 and 10. In a combustor 303 according to the embodiment, compressed air is supplied from the combustor air introducing system 7 to the second nozzle 35.

Figure 9:
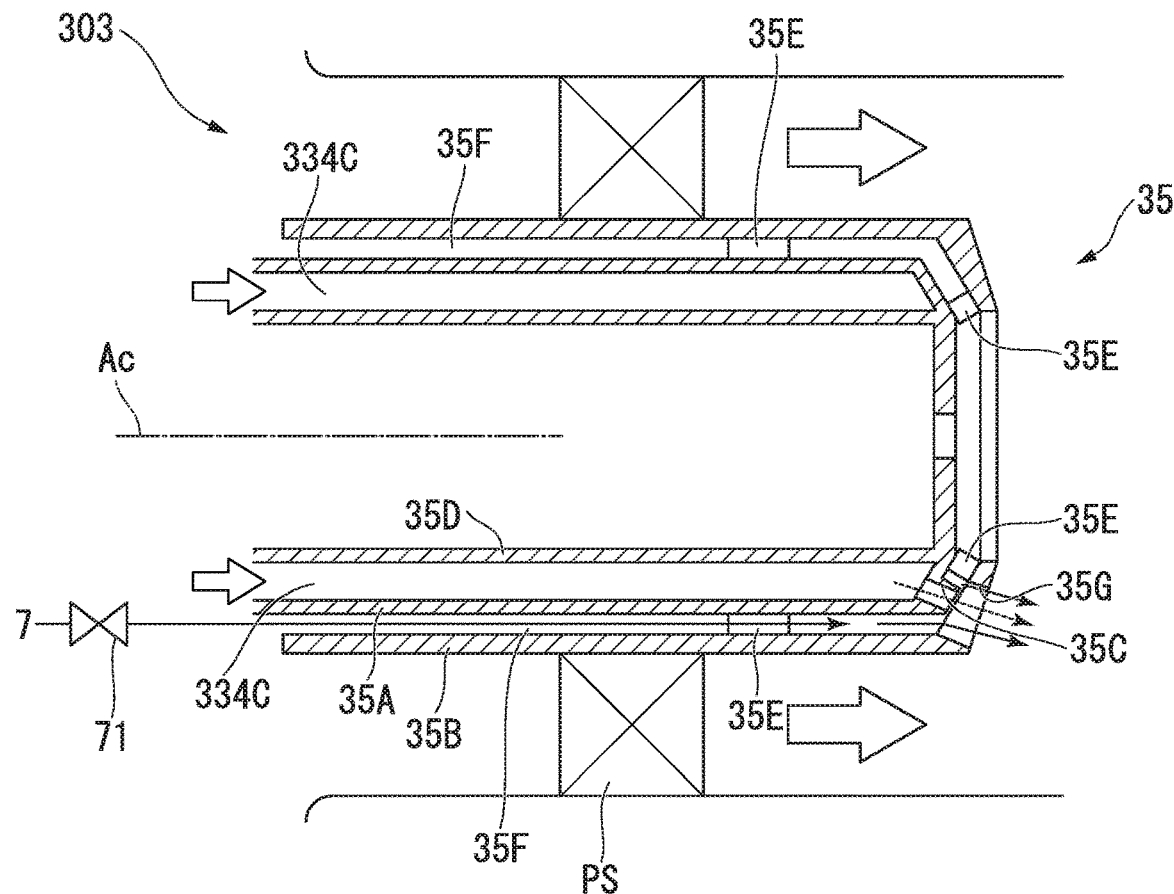
FIG. 9 is a sectional view taken along line IX-IX of FIG. 10.
Figure 10:
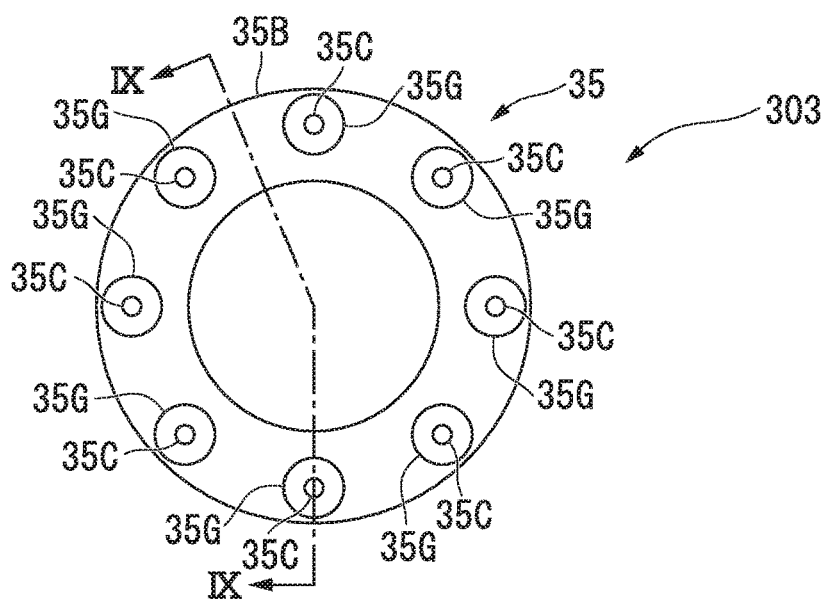
FIG. 10 is an enlarged view of main parts of a combustor (second nozzle) according to a third embodiment of the invention.

More specifically, as illustrated in FIG. 9, the second nozzle 35 has a double pipe structure. The second nozzle 35 has a second nozzle-inside pipe 35A and a second nozzle-outside pipe 35B. The second nozzle-inside pipe 35A extends along the central axis Ac. A fuel flow path 334C in which fuel flows is formed in the second nozzle-inside pipe 35A. The second nozzle-outside pipe 35B is coaxially provided with the second nozzle-inside pipe 35A. The second nozzle-outside pipe 35B covers the second nozzle-inside pipe 35A from the outside.

The second nozzle-inside pipe 35A has a cylindrical shape. A plurality of second nozzle injecting holes 35C that open toward the downstream side are formed in a downstream end surface of the second nozzle-inside pipe 35A. More specifically, as illustrated in FIG. 10, the plurality of second nozzle injecting holes 35C are equidistantly arranged in the circumferential direction of the central axis Ac. Eight second nozzle injecting holes 35C are formed in the embodiment.

A partition wall 35D having a cylindrical shape about the central axis Ac is provided on an inner circumferential side of the second nozzle injecting holes 35C, which is an inside of the second nozzle-inside pipe 35A. A space extending in a diameter direction of the central axis Ac is formed between the partition wall 35D and an inner circumferential surface of the second nozzle-inside pipe 35A. This space is set as the fuel flow path 334C for allowing fuel to flow therein.

The second nozzle-outside pipe 35B is provided so as to cover the second nozzle-inside pipe 35A from an outer circumferential side of the central axis Ac and the downstream side. A plurality of spacers 35E are provided between the second nozzle-outside pipe 35B and the second nozzle-inside pipe 35A. A space is formed between the second nozzle-inside pipe 35A and the second nozzle-outside pipe 35B by the spacers 35E. The space is set as a second nozzle air flow path 35F, in which compressed air flows, by being allowed to communicate with the combustor air introducing system 7. On the second nozzle air flow path 35F, the flow rate regulating valve 71 for regulating an air flow rate in the flow path is provided.

A plurality of (eight) second nozzle air holes 35G that are open at the same circumferential positions as the second nozzle injecting holes 35C are formed in a downstream end surface of the second nozzle-outside pipe 35B. Each of the second nozzle air holes 35G has an opening diameter larger than those of the second nozzle injecting holes 35C. That is, as illustrated in FIG. 10, in a case of seen from a direction of the central axis Ac, outer circumferential sides of the second nozzle injecting holes 35C are surrounded by opening edges of the second nozzle air holes 35G.

Both of the second nozzle injecting holes 35C and the second nozzle air holes 35G are open in a direction of slightly tilting with respect to the central axis Ac. Specifically, from the upstream side to the downstream side, the second nozzle injecting holes 35C and the second nozzle air holes 35G are open toward the outside in the diameter direction. In the embodiment, downstream end portions of the second nozzle injecting holes 35C slightly protrude from the downstream end surface of the second nozzle-inside pipe 35A to the downstream side.

In addition, like the first swirler MS in the second embodiment, a second swirler PS is provided on an outer circumferential surface of the second nozzle-outside pipe 35B. The second swirler PS has a plurality of swirler vanes arranged at an interval in the circumferential direction of the central axis Ac. A swirl component is added, by the second swirler PS, to compressed air that has flowed from the upstream side along the outer circumferential surface of the second nozzle 35.

Next, an operation of the combustor 303 according to the embodiment will be described. During operation of the combustor 303, compressed air supplied from the inside of the casing 5 flows from the upstream side to the downstream side along the outer circumferential surface of the second nozzle 35. Fuel supplied through the fuel flow path 334C is injected to the downstream side through the second nozzle injecting holes 35C. This fuel is ignited by an igniting device (not illustrated), and diffusion-combustion flame (pilot flame) is generated. By this pilot flame spreading to a premixed gas supplied from the first nozzle 34, premixed combustion flame is formed and a high-temperature and high-pressure combustion gas is generated.

In a flow of fuel injected from the second nozzle injecting holes 35C, compressed air is supplied through the second nozzle air holes 35G in the embodiment. That is, a gas in a state where compressed air and fuel are premixed can be injected from the second nozzle 35. In addition, the flow rate of compressed air is regulated by the flow rate regulating valve 71 being provided on extension of the second nozzle air flow path 35F.

In such a configuration, for example, in a case where stable combustion is necessary, such as a case where the gas turbine 1 is being operated in a low load zone, pilot flame can be made into diffusion-combustion flame by setting the flow rate of the compressed air to zero.

On the other hand, in a case where NOx creation is intended to be reduced, such as a case where the gas turbine 1 is being operated in a high load zone, a premixed gas can be blown out from the second nozzle 35 by supplying compressed air from the second nozzle air holes 35G. That is, the same combustion conditions as premixed combustion can be realized even in the second nozzle 35, in addition to the first nozzles 34. As described above, the characteristics of flame formed by the second nozzle 35 can be regulated according to an operation state of the gas turbine 1. For this reason, the gas turbine 1 can be more stably and efficiently operated.

The flow velocity of a fluid in the vicinity of the second nozzle 35 is increased by compressed air injected by the second nozzle air holes 35G as described above. As a result, a possibility that high-concentration fuel stays in the region, or a possibility that the staying fuel component is ignited and causes the occurrence of a flashback can be sufficiently reduced.

Each of the embodiments of the invention has been described with reference to the drawings hereinbefore. The configurations are merely examples, and various modifications can be added thereto without departing from the gist of the invention.

For example, a relative positional relationship between the second nozzle 35 and the first nozzles 34 is not limited by the embodiments. It is also possible to adopt another aspect according to design or specifications. In addition, the combustor 3, the combustor 203, and the combustor 303 are not necessarily limited to being provided in the gas turbine 1. It is possible to apply the combustors to any device insofar as the device is a device that generally requires combustion.

In addition, a configuration where air is extracted from the combustor cooling system 6 as a supply source of compressed air to the combustor air introducing system 7 is described as an example in the embodiment. However, it is also possible to adopt a configuration where compressed air in the casing 5 is directly led to the combustor air introducing system 7.

An example in which compressed air is extracted from the extraction position P in the combustor cooling system 6 on a casing 5 side from the heat exchanger 61 has been described in the embodiment. However, it is also possible to adopt a configuration where compressed air is extracted from another extraction position P in the combustor cooling system 6 on a cooling passage 31 side from the heat exchanger 61. In this configuration, the extraction position P is on the cooling passage 31 side of the heat exchanger 61. That is, air compressed by the sub-compressor 62 can be led to the combustor air introducing system 7. Accordingly, air can be stably introduced also into a location with a relatively high pressure in the combustor 3.

INDUSTRIAL APPLICABILITY

According to the gas turbine, a gas turbine that can stably operate even under a high temperature can be provided.

REFERENCE SIGNS LIST

1: gas turbine
2: compressor
3: combustor
4: turbine
5: casing
6: combustor cooling system
7: combustor air introducing system
8: compressor rotor
9: compressor casing
10: turbine rotor
11: turbine casing
12: gas turbine rotor
13: generator
30: combustion cylinder
31: cooling passage
32: swirler supporting cylinder
33: outer shell
34: first nozzle
35: second nozzle
36: connecting member
37: peg
50: combustor insertion hole
60: first line
61: heat exchanger
62: sub-compressor
70: second line
71: flow rate regulating valve
203: combustor
303: combustor
334C: fuel flow path
33A: nozzle stand
33B: outer shell main body
33C: fitting protrusion
34A: first nozzle main body
34B: first nozzle injecting hole
34C: fuel flow path
34D: first nozzle air hole
34E: first nozzle air flow path
35A: second nozzle-inside pipe
35B: second nozzle-outside pipe
35C: second nozzle injecting hole
35D: partition wall
35E: spacer
35F: second nozzle air flow path
35G: second nozzle air hole
PS: second swirler
38A: peg inner pipe
38B: peg outer pipe
38C: peg air flow path
38D: peg air hole
38E: injecting hole
Ac: central axis
Am: main axis
FC: air flow path
MS: first swirler
P: extraction position

What is claimed is:
1. A gas turbine comprising:
a compressor that compresses external air to generate compressed air;
a casing into which the compressed air is introduced;
a combustor that receives the compressed air from an inside of the casing and mixes the compressed air with fuel to form a mixture, the combustor configured to combust the mixture to generate a combustion gas, the combustor having a cylindrical body through which the combustion gas passes;
a turbine that is driven by the combustion gas;
a combustor cooling system that extracts air from the casing and that introduces the air into a cooling passage of the cylindrical body; and
a combustor air introducing system that extracts air flowing in the combustor cooling system and introduces the air into the combustor,
wherein the combustor cooling system has a sub-compressor configured to operate independently of the compressor, and a heat exchanger which causes the air to exchange heat before the sub-compressor has increased a pressure of the air,
wherein the combustor cooling system has a first line that connects a space in the casing to the cooling passage,
wherein the combustor air introducing system has a second line that connects a position on the first line between the heat exchanger and the casing to the combustor,
wherein the sub-compressor and the heat exchanger are disposed on the first line such that air at a first pressure flowing through the first line to the cooling passage is compressed by the sub-compressor to a second pressure higher than the first pressure to provide air from the first line to the cooling passage at the second pressure whereas air flowing through the second line is provided to the combustor at the first pressure,
wherein the combustor has a first swirler that causes a swirl to be generated in the combustion gas,
wherein the combustor has:
an outer shell, a portion of the outer shell being positioned radially outward from the cylindrical body;
an air flow path, along which the compressed air flows in a circulation direction, defined between an outer circumferential surface of the cylindrical body and the outer shell; and
a peg formed so as to extend in a first direction intersecting the circulation direction of the compressed air along the air flow path, the peg having an injecting hole configured to inject the fuel in a second direction intersecting the circulation direction of the compressed air along the air flow path, the injecting hole having a first center axis,
wherein the peg is connected to the second line and configured to receive air at the first pressure supplied from the combustor air introducing system via the second line, and a peg air hole is formed in the peg, the peg air hole having a second center axis substantially perpendicular to the first center axis and being configured to inject the received air downstream in the circulation direction of the compressed air along the air flow path, and wherein the peg is arranged such that the injected air from the peg air hole flows along the air flow path to the first swirler.

2. The gas turbine according to claim 1, wherein the combustor has a first nozzle that supplies the fuel into the cylindrical body and mixes the fuel with the compressed air,
wherein the first swirler is provided on an outer circumferential side of the first nozzle, and
wherein a first nozzle air hole for injecting air supplied from the combustor air introducing system toward a vortex center of the swirl is formed in a tip of the first nozzle.

3. The gas turbine according to claim 2, wherein the combustor has a second nozzle which is provided to be parallel to the first nozzle and in which a second nozzle injecting hole for injecting fuel is formed, and
wherein a second nozzle air hole that is formed on the second nozzle so as to surround the second nozzle injecting hole is configured to inject the air supplied from the combustor air introducing system in a flow of the fuel injected from the second nozzle injecting hole.

4. The gas turbine according to claim 2, wherein a fuel flow path configured to allow the fuel to flow is formed inside the first nozzle, and
a first nozzle injection hole is formed in the first nozzle between the tip and the first swirler for injecting the fuel, the first nozzle injection hole extending at an angle with respect to the fuel flow path.

* * * * *